US008854484B2

(12) United States Patent
Takagi

(10) Patent No.: US 8,854,484 B2
(45) Date of Patent: Oct. 7, 2014

(54) SYSTEMS AND METHODS FOR ESTABLISHING COMMUNICATION BETWEEN A PLURALITY OF IMAGING APPARATUSES

(75) Inventor: Toshiyuki Takagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 12/949,277

(22) Filed: Nov. 18, 2010

(65) Prior Publication Data

US 2011/0122270 A1 May 26, 2011

(30) Foreign Application Priority Data

Nov. 26, 2009 (JP) ................................. 2009-269189

(51) Int. Cl.
*H04N 5/232* (2006.01)
(52) U.S. Cl.
CPC .................................... *H04N 5/232* (2013.01)
USPC ..................................................... 348/211.3
(58) Field of Classification Search
USPC ........ 348/211.3, 211.99, 211.4, 211.2, 211.8, 348/211.13, 211.14
See application file for complete search history.

(56) References Cited

U.S. PATENT DOCUMENTS

| | | | | |
|---|---|---|---|---|
| 7,369,160 B2* | 5/2008 | Fujino et al. | ................ | 348/211.3 |
| 7,460,781 B2* | 12/2008 | Kanai et al. | ................... | 396/263 |
| 8,259,186 B2* | 9/2012 | Kiyoshige | ................ | 348/211.99 |
| 2003/0043272 A1* | 3/2003 | Nagao et al. | ................ | 348/207.1 |
| 2004/0150724 A1* | 8/2004 | Nozaki et al. | ............... | 348/211.4 |
| 2004/0183915 A1* | 9/2004 | Gotohda et al. | ......... | 348/207.11 |
| 2005/0213147 A1* | 9/2005 | Minatogawa | ................ | 358/1.15 |
| 2006/0165405 A1* | 7/2006 | Kanai et al. | .................... | 396/334 |
| 2007/0223901 A1* | 9/2007 | Fujimoto | ........................ | 396/56 |
| 2010/0306335 A1* | 12/2010 | Rios et al. | ..................... | 709/211 |
| 2011/0037865 A1* | 2/2011 | Takagi et al. | ............. | 348/211.9 |
| 2011/0052165 A1* | 3/2011 | Watanabe et al. | ............... | 396/56 |

FOREIGN PATENT DOCUMENTS

| | | | |
|---|---|---|---|
| JP | 2004-140796 A | | 5/2004 |
| JP | 2005-136833 A | | 5/2005 |
| JP | 2005-346572 A | | 12/2005 |
| JP | 2007-318491 A | | 12/2007 |

* cited by examiner

*Primary Examiner* — Gary C Vieaux
(74) *Attorney, Agent, or Firm* — Carter, DeLuca, Farrell & Schmidt, LLP

(57) ABSTRACT

An imaging apparatus includes a first communication unit configured to communicate with a control apparatus using a first communication protocol, an imaging unit configured to capture an image of a subject to obtain image data in response to an image capturing instruction from the control apparatus in a controlled state, a second communication unit configured to communicate with an external apparatus using a second communication protocol, and an activation unit configured to activate a function of receiving access using the second communication protocol from the external apparatus and transmitting the image data stored in the storage medium to the external apparatus.

10 Claims, 9 Drawing Sheets

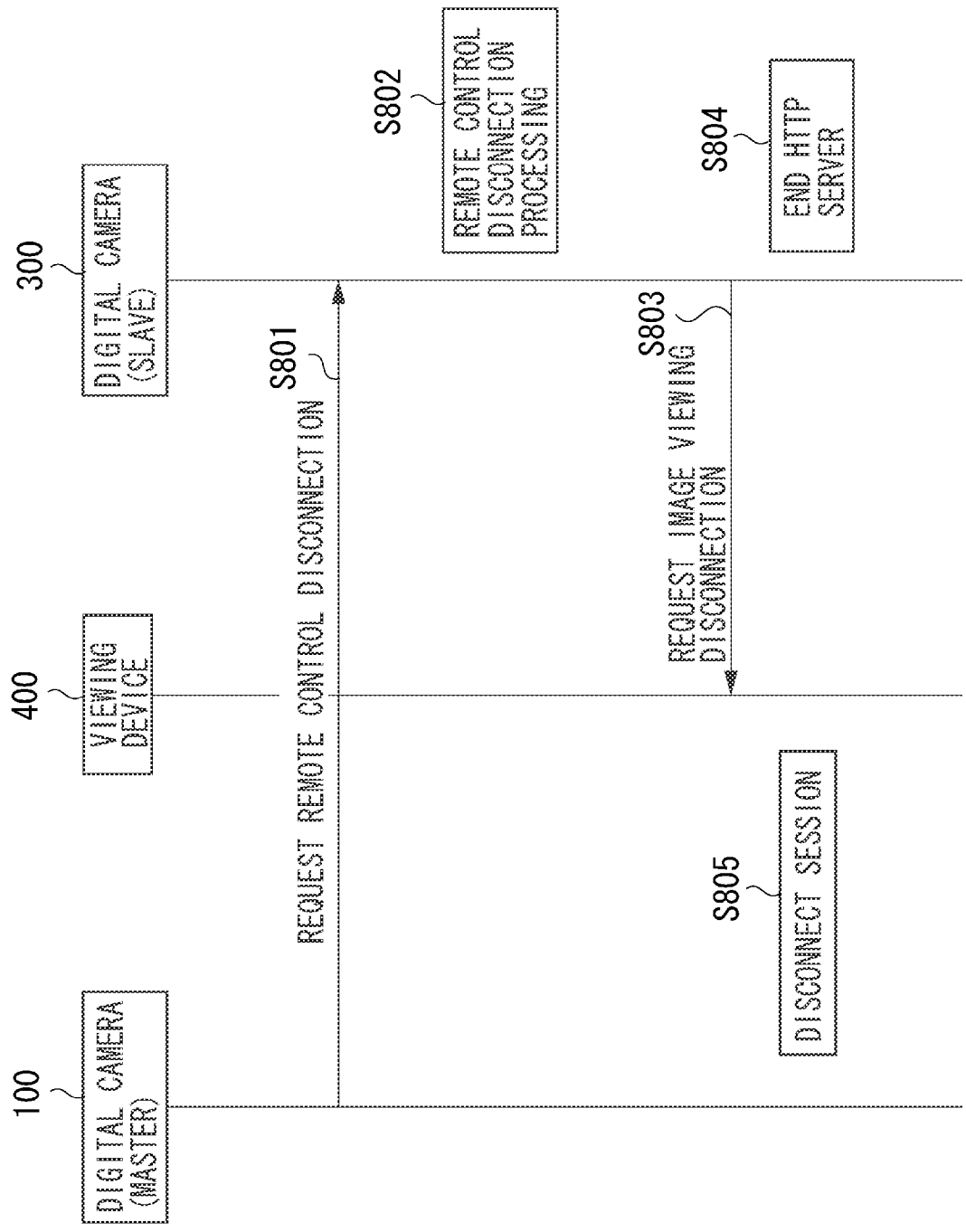

SYSTEMS AND METHODS FOR ESTABLISHING COMMUNICATION BETWEEN A PLURALITY OF IMAGING APPARATUSES

BACKGROUND OF THE INVENTION

1. Field of the Invention

The present invention relates to a system in which an imaging apparatus is connected to an external apparatus.

2. Description of the Related Art

A camera capable of performing remote shooting is conventionally well known in which an instruction is transmitted to a digital camera at a remote place from a controller or an external apparatus of the digital camera to cause the digital camera at the remote place to shoot an image (Japanese Patent Application Laid-Open No. 2005-136833). Consequently, a photographer, i.e., a user of the external apparatus can shoot an image if the user is at a position apart from the remotely controlled digital camera.

However, image data obtained as a result of the shooting instruction is stored to a storage medium of the digital camera. Thus, when checking the image data, the user of the external apparatus needs to go to the position of the digital camera at the remote place. After capturing the image by the digital camera, the image data can be transmitted from the digital camera to the external apparatus. In this case, a system for transmitting the image data from the digital camera to the external apparatus needs to be prepared for a protocol for remote shooting.

SUMMARY OF THE INVENTION

According to an aspect of the present invention, an imaging apparatus includes a first communication unit configured to communicate with a control apparatus using a first communication protocol, a shifting unit configured to shift the imaging apparatus to a controlled state for operating under control using the first communication protocol from the control apparatus, an imaging unit configured to capture an image of a subject to obtain image data in response to an image capturing instruction from the control apparatus in the controlled state, a storage control unit configured to store the image data obtained by the imaging unit to a storage medium, a second communication unit configured to communicate with an external apparatus using a second communication protocol, and an activation unit configured to activate a function of receiving access using the second communication protocol from the external apparatus and transmitting the image data stored in the storage medium to the external apparatus, wherein the activation unit activates the function if the shifting unit shifts the imaging apparatus to a controlled mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flow chart illustrating an example of a processing flow according to a second exemplary embodiment of the present invention.

DESCRIPTION OF THE EMBODIMENTS

Various exemplary embodiments, features, and aspects of the invention will be described in detail below with reference to the drawings.

[System Configuration]

Figure 1:
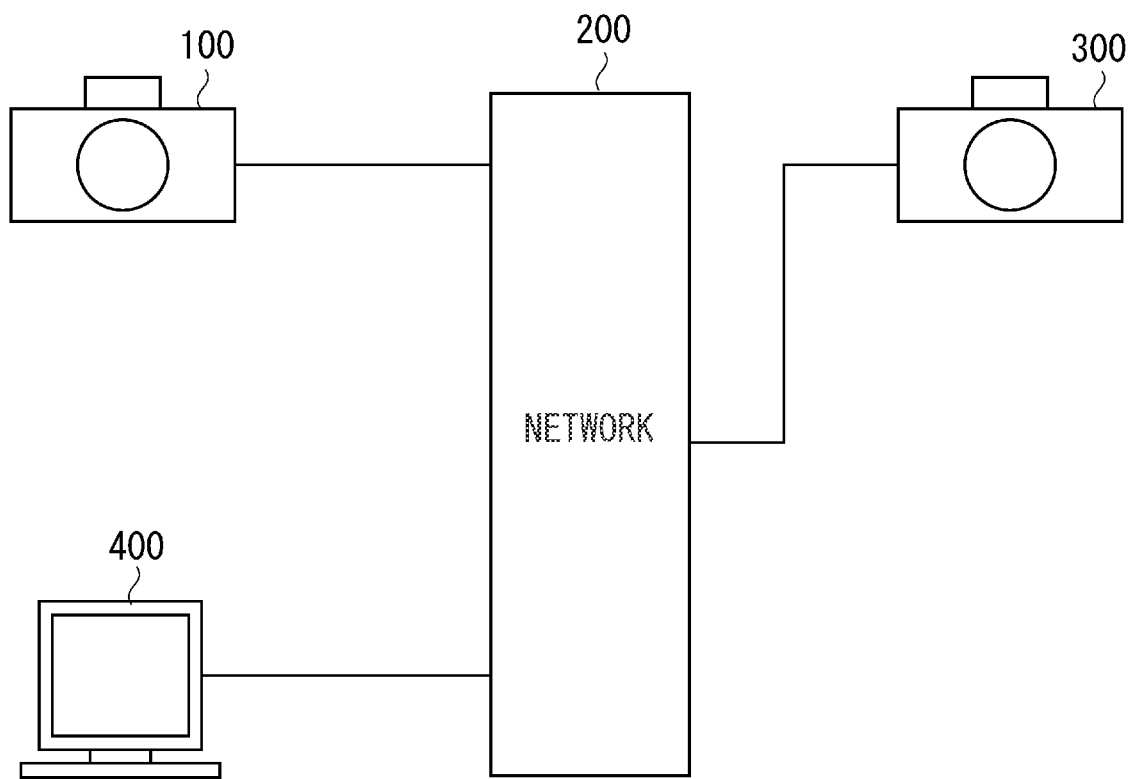
FIG. 1 illustrates an example of a system configuration according to a first exemplary embodiment of the present invention.

FIG. 1 illustrates an example of a system configuration according to a first exemplary embodiment of the present invention. The present system includes a digital camera 100 as an example of a control apparatus, a digital camera 300 as an example of a controlled apparatus, and a personal computer (PC) 400 as an example of a display apparatus. The digital camera 100, the digital camera 300, and the PC 400 are connected to each other via a network 200. The network 200 includes a connection configuration of terminals in an ad-hoc mode of a wireless local area network (LAN) or a configuration via a line such as a LAN or the Internet. From a viewpoint of the digital camera 300, the digital camera 100 is an example of a first external apparatus, and the PC 400 is an example of a second external apparatus.

Not only one control apparatus controls one controlled apparatus as a pair, but also one control apparatus may control a plurality of controlled apparatuses.

Figure 2A:
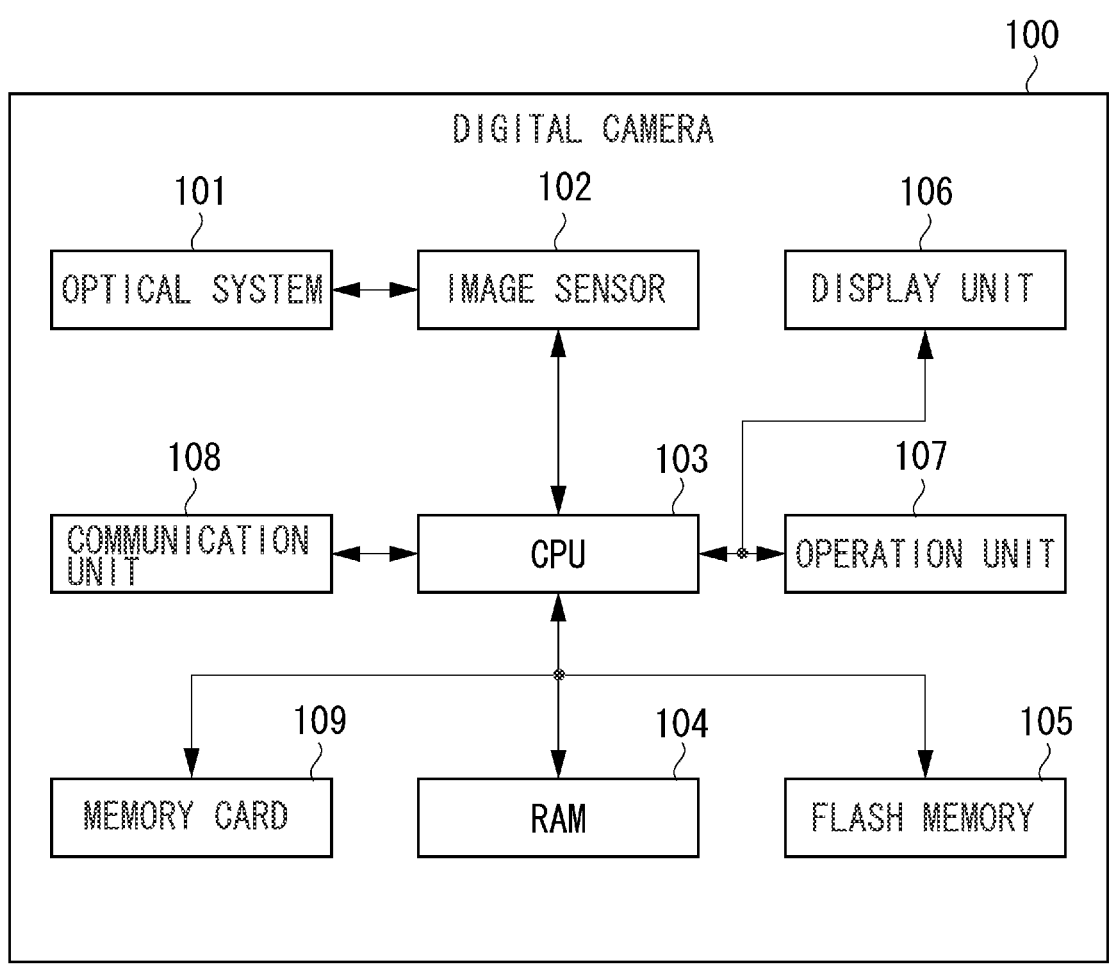
FIG. 2A illustrates an example of a configuration of a digital camera according to the first exemplary embodiment.

FIG. 2A illustrates a hardware configuration of the digital camera 100. The configuration of the digital camera 300 is similar to that of the digital camera 100. An optical system 101 includes a lens unit, a diaphragm, a shutter, and the like. An image sensor 102 converts an optical subject image into an electrical signal. A central processing unit (CPU) 103 controls image capturing, storage, and communication according to an input signal from various units or a program.

A random access memory (RAM) 104 includes a volatile memory that is operated as a primary storage device. A flash memory 105 includes a nonvolatile memory that is operated as a secondary storage device. A flash memory 105 stores various programs. The CPU 103 reads and executes the programs to control the digital camera 100. A display unit 106 includes a thin-film transistor (TFT) or a liquid crystal display (LCD). The digital camera 100 may be connected to the display unit 106 and include means configured to control the display unit 106. In other words, the digital camera 100 is not necessarily provided with the display unit 106 itself.

An operation unit 107 includes various button switches, a dial, a touch panel, and the like. A communication unit 108 functions as a communication interface to the digital camera 300 or the PC 400. The digital camera 100 may include means configured to access the communication unit 108, and the digital camera 100 is not necessarily provided with the communication unit 108. A memory card 109 is detachable to the digital camera 100 according to the present exemplary embodiment. The memory card 109 stores the image data obtained by the image capturing.

The flash memory 105 stores a program for enabling the digital camera 100 to function as a hypertext transfer protocol (HTTP) server. By executing the program, the CPU 103 can activate the digital camera 100 as the HTTP server and receive access from the external apparatus via the communication unit 108.

When the communication unit 108 is configured as a communication device independent of the digital camera 100, the communication device may include a CPU and an internal memory in which a program for enabling the communication device to function as the HTTP server is stored. In this case, the CPU of the communication device executes the program to activate the communication device as the HTTP server.

Figure 2B:
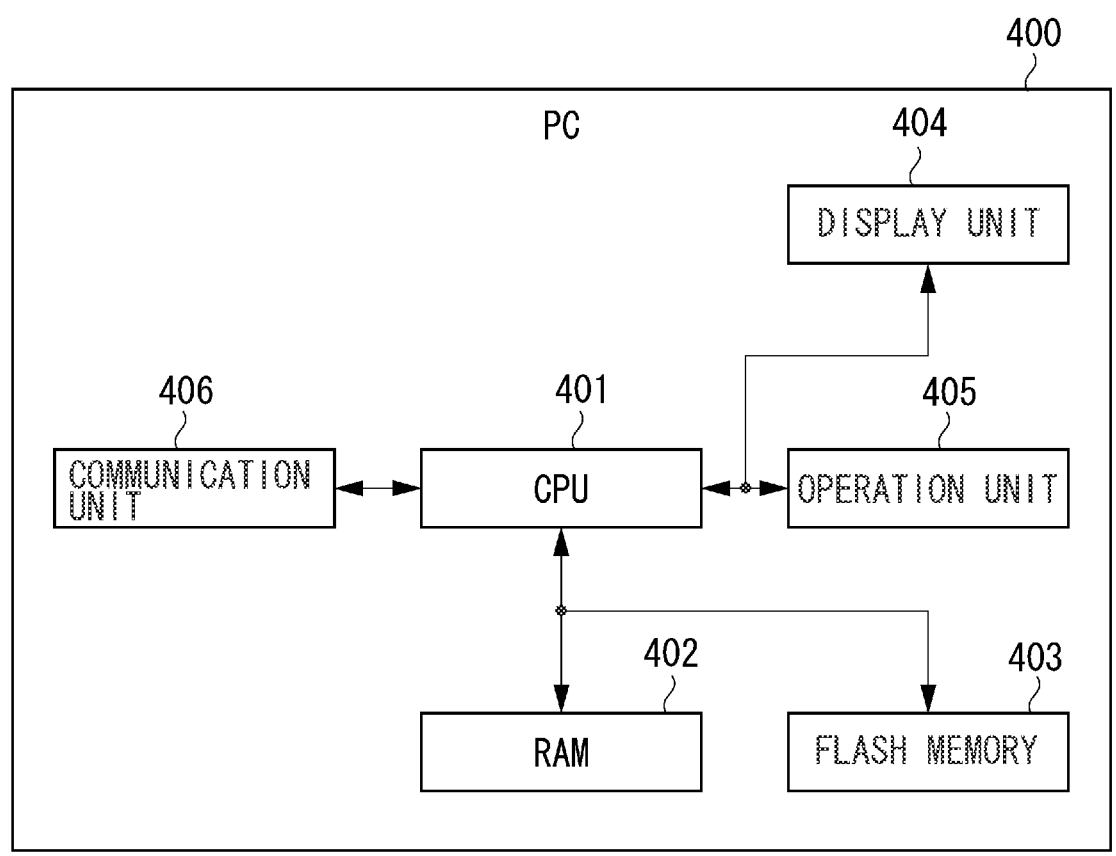
FIG. 2B illustrates an example of a configuration of a personal computer (PC) according to the first exemplary embodiment.

FIG. 2B illustrates a hardware configuration of the PC 400. Units 401 to 406 basically have functions similar to those of the units 103 to 108 in FIG. 2A respectively, and thus the description thereof is omitted.

[Establishment of Remote Control Communication]

Next, a communication method of the digital camera 100 is described. The digital camera 100 includes a plurality of communication methods. One communication method is remote control communication that remotely controls another digital camera from the digital camera 100. Another communication method is image viewing communication with which the digital camera 100 is activated as the HTTP server to receive the access from the PC 400 and a user of the PC 400 can view contents in the memory card 109. According to the present exemplary embodiment, the two communications are realized by different protocols.

Figure 3A:
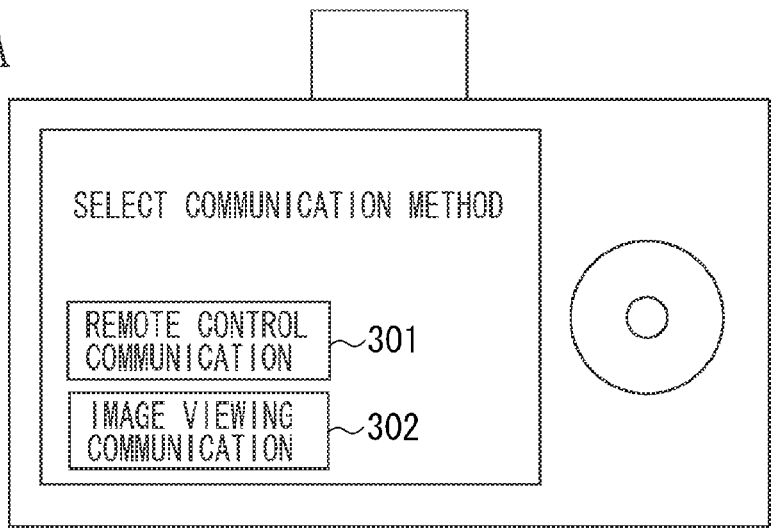
FIG. 3A illustrates an example of a setting screen for a communication method according to the first exemplary embodiment.

FIG. 3A illustrates an example of a setting screen of a communication method in the digital camera 100. The user of the digital camera 100 performs menu operation with the operation unit 107, and the display unit 106 thus displays the setting screen. The user of the digital camera 100 presses a remote control communication button 301 or an image viewing communication button 302 with the operation unit 107, so that one of the communication methods to be used is selected.

The remote control communication is described below. A remote control communication apparatus needs to set a function as a control apparatus (hereinafter, referred to as a "master") that remotely controls another apparatus and a function as a controlled apparatus (hereinafter, referred to as a "slave") that is remotely controlled. According to the present exemplary embodiment, the digital camera 100 is set as the master by shifting to a control mode, and the digital camera 300 is set as the slave by shifting to a controlled mode. The setting of the master and the slave is described below.

Figure 3B:
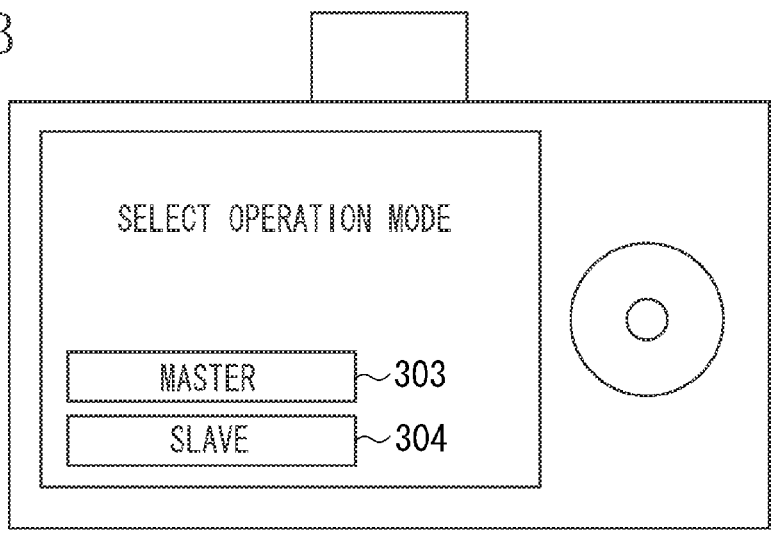
FIG. 3B illustrates an example of a master and slave setting screen according to the first exemplary embodiment.

On the screen in FIG. 3A, when the remote control communication button 301 is selected as the communication method, a screen illustrated in FIG. 3B is displayed. The user allows the display unit 106 in the digital camera 100 to display the screen illustrated in FIG. 3B and then selects a master button 303. The user allows the display unit 106 in the digital camera 300 to display the screen illustrated in FIG. 3B and then selects a slave button 304. By designating which apparatus is the master or the slave, the digital cameras 100 and 300 start the communication therebetween and establish a relationship between the master and the slave.

Figure 3C:
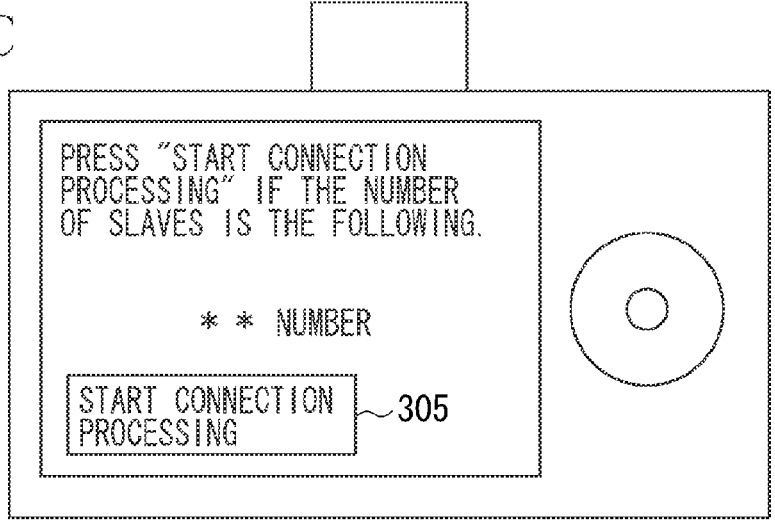
FIG. 3C illustrates an example of a screen for checking a number of slaves of the master according to the first exemplary embodiment.

In the remote control communication, the master can remotely control a plurality of slaves. Therefore, the digital camera 100 to which the master button 303 is selected can receive connection requests from the plurality of slaves. During receiving the connection request, the digital camera 100 causes the display unit 106 to display a screen illustrated in FIG. 3C. Thus, the user can easily understand how many slaves transmit the connection request at that point. When the user of the digital camera 100 confirms that the number of slaves reaches a desired one, the user selects a connection processing start button 305, and determines an apparatus for remote control communication.

Figure 4:
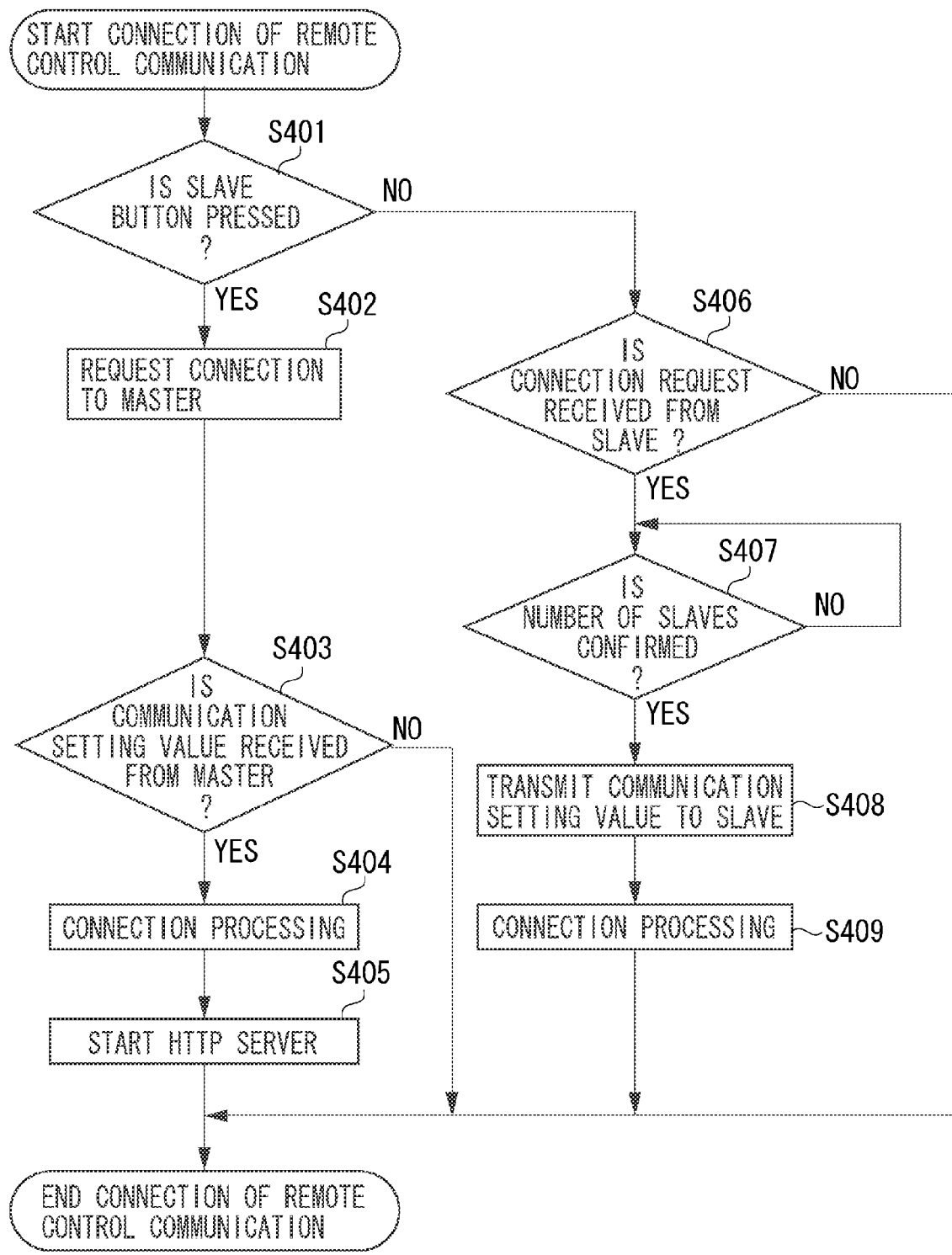
FIG. 4 is a flow chart illustrating an example of a processing flow according to the first exemplary embodiment.

FIG. 4 is a flow chart illustrating processing for establishing the remote control communication between the digital camera 100 and the digital camera 300 according to the present exemplary embodiment. The CPUs 103 in the digital cameras 100 and 300 control the units according to the program stored in the flash memory 105, so that the following processing can be realized. Unless otherwise described, the subsequent flow chart and sequence diagrams are similarly realized.

One of the buttons 303 and 304 is selected on the screen illustrated in FIG. 3B, processing in the flow chart is started. According to the present exemplary embodiment, an example in which the digital camera 100 is the master and the digital camera 300 is the slave is described below.

In step S401, the CPU 103 determines whether the slave button 304 is pressed on the screen in FIG. 3B. First, the case is described in which the slave button 304 in the digital camera 300 is pressed.

If it is determined that the slave button 304 is pressed (YES in step S402), then in step S402, the digital camera 300 transmits a connection request to the digital camera 100 as the master. In step S403, the digital camera 300 waits to receive a communication setting value transmitted from the digital camera 100. When the digital camera 100 is connected to the digital camera 300 in an ad-hoc mode of a wireless LAN, the digital camera 100 generates and transmits the communication setting values of a service set identifier (SSID), an encryption key, an Internet protocol (IP) address for slave, and the like.

When the digital camera 300 receives the communication setting values (YES in step S403), in step S404, the digital camera 300 registers the communication setting values to the flash memory 105, and performs connection processing to the network.

After completing the connection processing, in step S405, the CPU 103 in the digital camera 300 reads a predetermined program to the RAM 104, and executes the program, thereby activating an HTTP server function. This processing is simply referred to as "Activate the HTTP server". In the activation of the HTTP server in step S405, the user only presses the slave button 304. In other words, the user of the digital camera 300 does not need to perform operations for activating the HTTP server, such as operating the digital camera 300 again to display the screen illustrated in FIG. 3A, and pressing the image viewing communication button 302. The above described processing is the connection processing of the digital camera 300 as the slave camera.

A description is given of the case in which it is determined in step S401 that the slave button 304 is not pressed, that is, the master button 303 is pressed. In the present exemplary embodiment, a description is given of an example of pressing the master button 303 in the digital camera 100. In step S406, the digital camera 100 waits to receive the connection request transmitted from the digital camera 300.

At this time, the digital camera 100 counts how many slaves transmit the connection request, and displays the number of the slaves on the display unit 106. When the user confirms that the connection requests are received from all the slaves that perform the remote control connection and the number of the slaves is displayed, the user presses the connection processing start button 305. In this example, since the slave is the digital camera 300 only, the user confirms one slave, and presses the connection processing start button 305.

When the number of slaves is confirmed (YES in step S407), in step S408, the digital camera 100 transmits the connection setting value to the digital camera 300. In step S409, the digital camera 100 performs the connection processing.

When the connection processing is completed, the slave can be remotely controlled from the master. An example of the remote control is linked shooting. In the linked shooting, a release button of the master is pressed to instruct image capturing, and the master transmits an image capturing instruction to the slave in response to the instruction. The slave that receives the image capturing instruction captures an image, and stores image data obtained by the image capturing to the memory card 109 thereof. The master executes the image capturing in response to the pressing of the release button thereof. Therefore, the image capturing can be accordingly performed by the master and the slave at the similar timing. The linked shooting is useful to capture images of the same scene at different angles of view.

The above described processing is the connection processing during the remote control communication. In the connection processing, the digital camera to which the function as the slave is set automatically activates the HTTP server in the remote control communication. Even when the slave is set at a remote place where the user cannot easily operate the slave, the processing enables the user to access the HTTP server activated on the slave side using the PC 400. In other words, the user can view the image data in the slave at the remote place.

[Sequence from Connection to Display]

Figure 5:
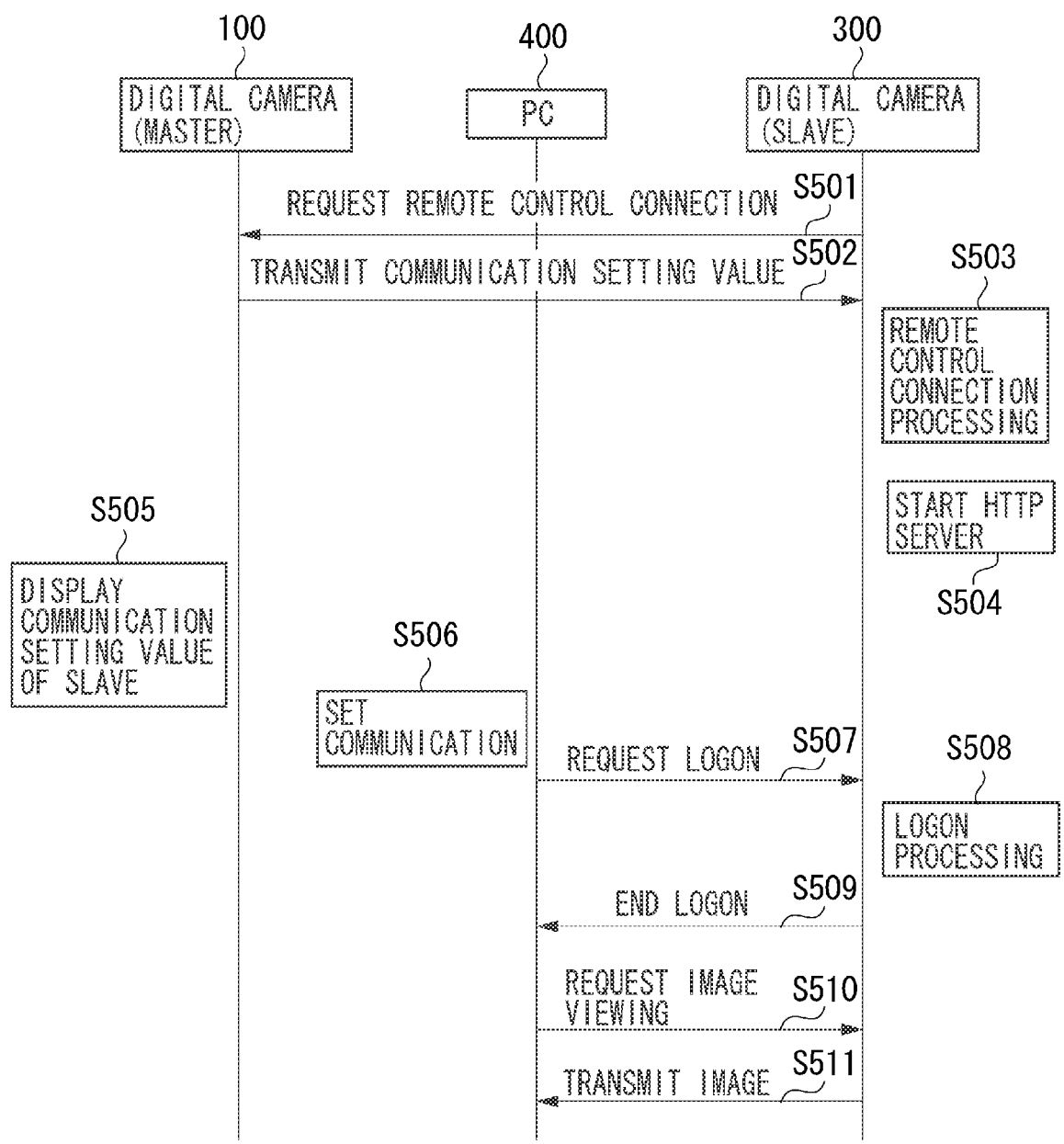
FIG. 5 illustrates an example of a processing sequence according to the first exemplary embodiment.

FIG. 5 is a sequence diagram illustrating communication among the digital camera 100, the digital camera 300, and the PC 400 in FIG. 1. Processing from connection for remote control communication to displaying the image data in the slave on the PC 400 is described with reference to FIG. 5. An example of the digital camera 100 as the master and the digital camera 300 as the slave is described.

In step S501, the digital camera 300 transmits a remote control connection request to the digital camera 100 via the communication unit 108, and the digital camera 100 receives the request. In step S502, the digital camera 100 that receives the connection request transmits the connection setting value to the digital camera 300, and the digital camera 300 receives the connection setting value. In step S503, the digital camera 300 receives the connection setting value and then performs the connection processing to the network 200. With the processing, the relationship between the master and the slave is established. The digital camera 100 can thus remotely control the digital camera 300.

When the connection processing ends, in step S504, the digital camera 300 activates the HTTP server on the RAM 104.

Figure 6:
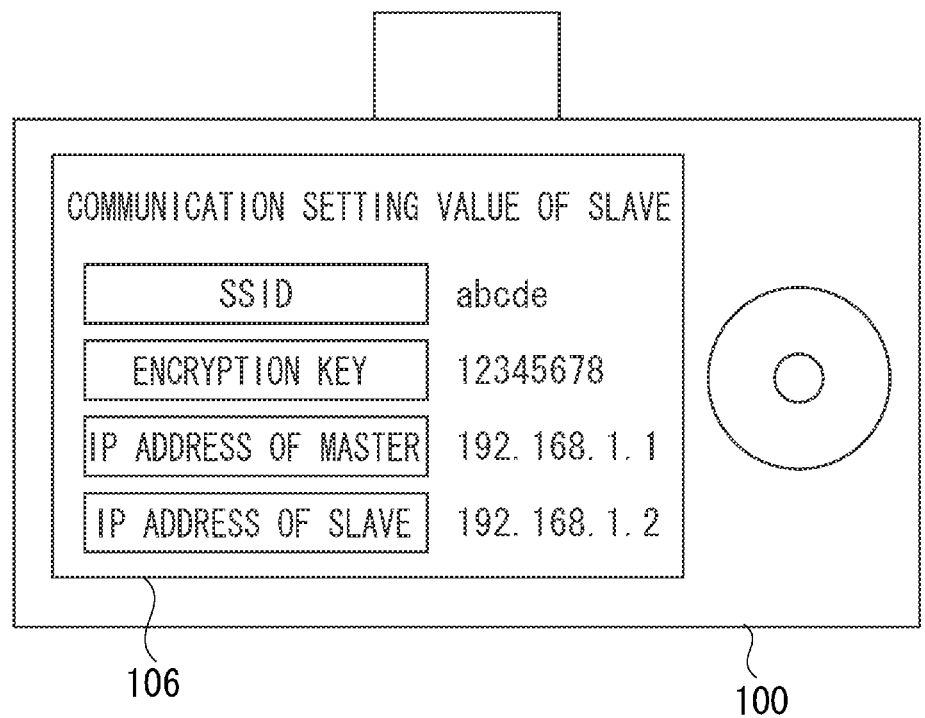
FIG. 6 illustrates an example of a display screen for a communication setting value according to the first exemplary embodiment.

In step S505, the digital camera 100 as the master displays the connection setting values of the digital camera 300 on the display unit 106. An example to be displayed at this time is illustrated in FIG. 6. The displayed connection setting values includes an SSID, an encryption key, an IP address of the master, and an IP address of the slave. The user of the digital camera 100 confirms the display and activates a web browser on the PC 400, for example. If the IP address of the slave as a uniform resource locator (URL) is input, then in step S506, the PC 400 accesses the HTTP server of the digital camera 300 to establish the HTTP connection to the digital camera 300.

When the digital camera 100 has the web browser, the digital camera 100 may directly access the HTTP server of the digital camera 300, instead of accessing from the PC 400. Application other than the web browser may be used to access the HTTP server.

When the PC 400 is connected to the digital camera 100 via a universal serial bus (USB) cable or a LAN cable, the digital camera 100 may automatically transmit the connection setting value to the PC 400 and the PC 400 may automatically access the HTTP server. With this operation, the user of the PC 400 can omit an operation for inputting the IP address. The connection setting value may be transmitted from the digital camera 100 to the PC 400 via a medium such as a secure digital (SD) card.

Returning to FIG. 5, in step S507, the PC 400 transmits a logon request to the digital camera 300 as the HTTP server in response to a predetermined operation to the PC 400 by the user thereof, and the digital camera 300 receives the logon request.

In step S508, the digital camera 300 receives logon information and performs logon processing of the PC 400. The logon processing includes HTTP authentication or user authentication. For example, when receiving the logon request in step S507, the digital camera 300 transmits a login screen to the PC 400.

The user of the PC 400 inputs identification (ID) or a password via the web browser and transmits the ID or the password to the digital camera 300. The digital camera 300 that receives the ID or the password performs the HTTP authentication or the user authentication. When the logon processing is completed, in step S509, the digital camera 300 transmits the completion of logon to the PC 400.

In step S510, the PC 400 transmits a request for viewing the image data in the memory card 109 in the digital camera 300 according to a predetermined operation executed to the PC 400 by the user thereof, and the digital camera 300 receives the request.

In step S511, the digital camera 300 generates a hypertext markup language (HTML) file for displaying the image data in the memory card 109 using the function of the HTTP server, and transmits the HTML file to the PC 400. The PC 400 receives the HTML file, interprets the HTML file, and displays the viewing screen on the display unit 106 of the PC 400.

Figure 7:
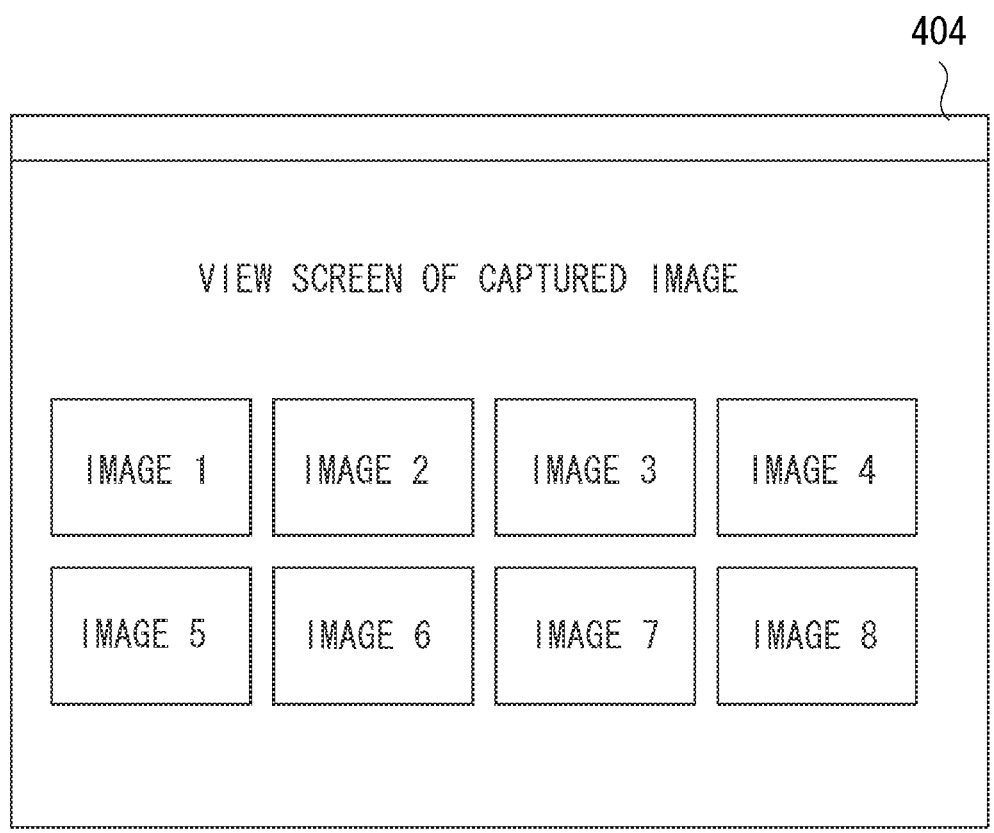
FIG. 7 illustrates an example of an image viewing screen according to the first exemplary embodiment.

FIG. 7 illustrates an example of the viewing screen. Referring to FIG. 7, the image data displayed as a list is stored in the memory card 109 in the digital camera 300. With this operation, even if the digital camera 300 is set as the slave at the remote place, the user of the PC 400 can view the image data with communication via the HTTP.

Next, a second exemplary embodiment is described. According to the present exemplary embodiment, a large number of parts are common to those according to the first exemplary embodiment. Therefore, descriptions of the common parts are omitted and a portion specific to the present exemplary embodiment is mainly described.

FIG. 8 is a communication sequence diagram of the digital camera 100, the digital camera 300, and the PC 400 in FIG. 1 according to the present exemplary embodiment, particularly, relating to disconnection of the remote control communication. It is assumed that the processing in steps S501 to S511 in FIG. 5 is executed before step S801. The sequence starts when the end of the remote control operation or power-off of the digital camera 300 is instructed by the operation of the digital camera 100 by the user.

In step S801, the digital camera 100 transmits a remote control disconnection request to the digital camera 300, and the digital camera 300 receives the request. In step S802, when receiving the remote control disconnection request, the digital camera 300 disconnects the remote control communication.

When the remote control connection is disconnected, in step S803, the digital camera 300 transmits an image viewing disconnection request to the PC 400. Then in step S804, the digital camera 300 ends the program of the HTTP server activated on the RAM 104. In step S805, the PC 400 that receives the image viewing disconnection request disconnects a session to the digital camera 300.

This operation is performed by the following reasons. More specifically, the disconnection of the remote control communication between the digital camera 100 and the digital camera 300 means that new image data is not captured by the digital camera 300 side by the remote control thereafter. Therefore, image viewing communication using the HTTP is automatically disconnected when the remote control communication is disconnected, and power consumption is suppressed.

According to the second exemplary embodiment, when the remote control communication between the digital camera 100 and the digital camera 300 is disconnected, the digital camera 100 disconnects the image viewing communication with the PC 400 to save the power consumption. In a third exemplary embodiment, if the remote control communication is disconnected, the image viewing communication between the PC 400 and the digital camera 300 may be maintained. More specifically, referring to FIG. 8, the processing in steps S803, S804, and S805 is not performed after the processing in step S802. The continuation of the image viewing connection enables the user to view the images captured by the digital camera after disconnecting the remote control connection.

The second and third exemplary embodiments can provide advantages for the user. Therefore, the user may select the priority of the second or third exemplary embodiment. According to a fourth exemplary embodiment, it can be selected whether to disconnect the image viewing communication when the remote control communication is disconnected in order to suppress the power consumption or not to disconnect the image viewing communication when the remote control communication is disconnected in order to continue the viewing of the image data after the shooting.

More specifically, the display unit 106 in the digital camera 100 may display a dialogue, and receive selection of the user. Alternatively, the digital camera 300 may create an HTML file for receiving the selection and transmit the HTML file to the PC 400 to receive the selection of the user on the screen of the PC 400.

The details of the present invention are described according to the exemplary embodiments. The present invention is not limited to the specific exemplary embodiments, and includes various modifications without departing the essentials of the present invention. A part of the exemplary embodiments may be properly combined.

The present invention is realized by executing the following processing. More specifically, software (program) that realizes the functions of the exemplary embodiments is supplied to a system or an apparatus via a network or various storage media, and a computer (or a CPU or a micro processing unit (MPU)) in the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-269189 filed Nov. 26, 2009, which is hereby incorporated by reference herein in its entirety.

What is claimed is:

1. An imaging apparatus comprising:
a communication unit configured to communicate with a control apparatus using a first communication method implemented by a first communication protocol, the first communication method being a remote control communication method, wherein the imaging apparatus is changed to a controlled state for operating under control of the first communication protocol from the control apparatus;
an imaging unit configured to capture an image of a subject to obtain image data in response to an image capturing instruction from the control apparatus in the controlled state;
a storage medium configured to store the image data obtained by the imaging unit; and
a control unit configured to control the imaging apparatus,
wherein the communication unit is further configured to communicate with an external apparatus using a second communication method implemented by a second communication protocol, the second communication method being an image transmitting communication method,
wherein the second communication protocol is different from the first communication protocol, and
wherein the control unit controls the imaging apparatus in a manner such that a function, for receiving access from the external apparatus in accordance with the second communication protocol and transmitting the image data stored in the storage medium to the external apparatus in response to receiving the access in accordance with the second communication protocol, is activated in response to the imaging apparatus being changed to a controlled state.

2. The imaging apparatus according to claim 1, wherein the external apparatus is another imaging apparatus.

3. The imaging apparatus according to claim 2, wherein if an operation for instructing capturing image is performed in the another imaging apparatus in the controlled state, the imaging unit executes image capturing linked to the another imaging apparatus.

4. The imaging apparatus according to claim 1, wherein the control apparatus is different from the external apparatus.

5. The imaging apparatus according to claim 1, wherein the imaging apparatus is activated as a hypertext transfer protocol (HTTP) server.

6. The imaging apparatus according to claim 5, wherein the access from the external apparatus is performed via a web browser for displaying the image data transmitted from the HTTP server.

7. The imaging apparatus according to claim 1, wherein if the controlled state is terminated, the control unit controls the imaging apparatus in a manner such that the function is terminated.

8. The imaging apparatus according to claim 1, wherein if the controlled state is terminated, the control unit controls the imaging apparatus in a manner such that a selection is made whether to terminate a server function or to maintain the server function without terminating.

9. A method for controlling an imaging apparatus that communicates with a control apparatus using a first communication method implemented by a first communication protocol and communicates with an external apparatus using a second communication method implemented by a second communication protocol, the first communication method being a remote control communication method and the second communication method being an image transmitting communication method, wherein the second communication protocol is different from the first communication protocol, the method comprising:

changing the imaging apparatus to a controlled state for operating under control of the first communication protocol from the control apparatus;

capturing an image of a subject to obtain image data in response to an image capturing instruction from the control apparatus in the controlled state;

storing the image data obtained by the image capturing to a storage medium; and activating a function for receiving access from the external apparatus in accordance with the second communication protocol and transmitting the image data stored in the storage medium to the external apparatus in response to receiving the access in accordance with the second communication protocol, wherein the function is activated in response to the imaging apparatus being changed to a controlled state.

10. A non-transitory computer-readable recording medium storing a computer-executable process, the computer-executable process causing a computer to control an imaging apparatus that communicates with a control apparatus using a first communication method implemented by a first communication protocol and communicates with an external apparatus using a second communication method implemented by a second communication protocol, the first communication method being a remote control communication method and the second communication method being an image transmitting communication method, wherein the second communication protocol is different from the first communication protocol, the method comprising:

changing the imaging apparatus to a controlled state for operating under control of the first communication protocol from the control apparatus;

capturing an image of a subject to obtain image data in response to an image capturing instruction from the control apparatus in the controlled state;

storing the image data obtained by the image capturing to a storage medium; and activating a function for receiving access from the external apparatus in accordance with the second communication protocol and transmitting the image data stored in the storage medium to the external apparatus in response to receiving the access in accordance with the second communication protocol, wherein the function is activated in response to the imaging apparatus being changed to a controlled state.

* * * * *